US010761266B2

(12) United States Patent
Liu et al.

(10) Patent No.: US 10,761,266 B2
(45) Date of Patent: Sep. 1, 2020

(54) INTEGRATION OF DIRECT-BANDGAP OPTICALLY ACTIVE DEVICES ON INDIRECT-BANDGAP-BASED SUBSTRATES

(71) Applicant: The Regents of the University of California, Oakland, CA (US)

(72) Inventors: Alan Young Liu, New Orleans, LA (US); Justin Norman, Goleta, CA (US); Arthur Gossard, Santa Barbara, CA (US); John Bowers, Santa Barbara, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/306,740

(22) PCT Filed: May 31, 2017

(86) PCT No.: PCT/US2017/035225
§ 371 (c)(1),
(2) Date: Dec. 3, 2018

(87) PCT Pub. No.: WO2017/210300
PCT Pub. Date: Dec. 7, 2017

(65) Prior Publication Data
US 2019/0129097 A1 May 2, 2019

Related U.S. Application Data

(60) Provisional application No. 62/345,535, filed on Jun. 3, 2016.

(51) Int. Cl.
*G02B 6/13* (2006.01)
*G02B 6/136* (2006.01)
*G02B 6/12* (2006.01)

(52) U.S. Cl.
CPC ............. *G02B 6/131* (2013.01); *G02B 6/136* (2013.01); *G02B 2006/12078* (2013.01);
(Continued)

(58) Field of Classification Search
CPC .................... G02B 6/131; G02B 6/136; G02B 2006/12078; G02B 2006/12121; G02B 2006/12128; G02B 2006/12178
See application file for complete search history.

(56) References Cited

U.S. PATENT DOCUMENTS 5,075,742 A 12/1991 Gerard et al.
5,565,693 A * 10/1996 Sasaki ..................... H01S 5/026
257/14

(Continued)

OTHER PUBLICATIONS

Able, et al., "Growth of crack-free Gat\J on Si (III) with graded AlGaN buffer layers", J. Cryst. Growth, 276, 2005, 415-418.
(Continued)

*Primary Examiner* — Daniel Petkovsek
(74) *Attorney, Agent, or Firm* — Billion & Armitage; Michael A. Collins

(57) ABSTRACT

A silicon-photonic integrated circuit comprising a direct-bandgap-semiconductor-based active optical device that is epitaxially grown on an indirect-bandgap SOI substrate (108) is disclosed. The structure of the active optical device includes an active region (120) having quantum dots (206) made of InGaAs that are embedded in one or more confinement layers (n-InP, p-InP), where the bandgap of the confinement layers is higher than that of the quantum dots. Further the confinement-layer material is preferably lattice matched to the quantum dot material in order to suppress associated crystalline defects within the material are located away from the center of its bandgap such that they suppress recombination-enhanced defect-reaction-driven degradation of the active optical device. The active optical device is
(Continued)

epitaxially grown on a handle substrate of an SOI substrate that has a surface waveguide formed in its device layer, where the active region and the surface waveguide are at the same height above the handle wafer surface.

20 Claims, 10 Drawing Sheets

(52) U.S. Cl.
CPC .............. *G02B 2006/12121* (2013.01); *G02B 2006/12128* (2013.01); *G02B 2006/12178* (2013.01)

(56) References Cited

U.S. PATENT DOCUMENTS

| | | | | |
|---|---|---|---|---|
| 6,674,778 | B1* | 1/2004 | Lin | B82Y 20/00 372/46.01 |
| 9,239,424 | B2* | 1/2016 | Czornomaz | G02B 6/12004 |
| 9,625,647 | B2* | 4/2017 | Taylor | H01S 5/0421 |
| 2007/0105256 | A1* | 5/2007 | Fitzgerald | H01L 21/76254 438/34 |
| 2015/0214425 | A1 | 7/2015 | Taylor | |

OTHER PUBLICATIONS

Alexander, et al., "ystematic study of the effects of modulation p-doping on 1.3->tm quantum-dot lasers", IEEE J. Quantum Electron. 43, 2007, 1129-1139.
Beanland, et al., "Quantum dots in strained layers preventing relaxation through the precipitate hardening effect", J. Appl. Phys, 104, 2008, 123502.
Beanland, et al., "Structural analysis of life tested 1.3 um quantum dot lasers", J. Appl. Phys. 103, 2008, 014913.
Bhattacharya, et al., "Room-temperature self-organised InO.5Gao. oAs quantum dot laser on silicon", Electron. Lett. 41, 2005, 742-744.
Bimberg, et al., "Quantum dots: promises and accomplishments", Mater. Today vol. 14, No. 9, 2011, 388-397.
Boroditsky, et al., "Surface recombination measurements on III-V candidate materials for nanostructure light-emitting diodes", J. Appl. Phys., 87, 2000, 3497-3504.
Camacho-Aquilera, et al., "An electrically pumped germanium laser", Opt. Express 20, 2012, 11316-11320.
Chen, et al., "1.3 um InAs/GaAs quantum-dot laser monolithically grown on Si substrates operating over 100° C.", Electron. Lett. 50, 2014, 1467-1468.
Chen, et al., "A comb laser driven DWDM silicon photonic transmitter with microring modulator for optical interconnect", CLEO: Science and Innovations (Optical Society of Amelica, 2015), paper STu4F-1., 2015.
Chobpattana, et al., "Extremely scaled high-k/In (0.53)Ga (0.47)As gate stacks with low leakage and low interface trap densities", J. Appl. Phys., 116, 2014, 124104.
Fitzgerald, et al., "Epitaxial necking in GaAs grown on pre-patterned Si substrates", J. Electron. Mater. 20, 1991, 839-853.
Gerard, et al., "InAs quantum boxes: highly efficient radiative traps for light emitting devices on Si", Appl. Phys. Lett. 68, 1996, 3123-3125.
Gilfert, et al., "High gain 1.55 Jlm diode lasers based on InAs quantum dot like active regions", Appl. Phys. Lett. 98, 2011, 201102.
Heck, et al., "Energy efficient and energy proportional optical interconnects for multi-core processors: driving the need for on-chip sources", IEEE J. Sel. Top. Quantum Electron. 20,, 2014, 332-343.
Huang, et al., "InGaAs/GaAs quantum well lasers grown on exact GaP/Si (001)", Electron. Lett., 50, 2014, 1226-1227.
Jhang, et al., "InAs/GaAs quantum dot lasers on silicon-on-insulator substrates by metal stripe wafer bonding", IEEE Photon. Technol. Lett. 27, 2015, 875-878.
Kageyama, et al., "Extremely high temperature (220°C.) continuous wave operation of 1300-nm-range quantum-dot lasers", The European Conference on Lasers and Electro-Optics (Optical Society of America, 2011.
Karachinsky, et al., "Metamorphic 1.5 Jlm-range quantum dot lasers on a GaAs substrate", semicond. Sci. Technol., 21, 2006, 691.
Kazi, et al., "Realization of GaAs/AlGaAs lasers on Si substrates using epitaxial lateral overgrowth by metalorganic chemical vapor deposition", JpnJ. Appl. Phys., 40, 2001, 4903.
Kim, "Lateral carrier confinement in miniat11re lasers using quantum dots", JEEE J. Sel. Top. Quantum Electron, 6, 2000, 504-510.
Kimerling, "Recombination enhanced defect reactions", Solid-State Electron. 21, 1978, 1391-1401.
Lee, et al., "Continuous wave InAs/GaAs quantum-dot laser diodes monolithically grown on Si substrate with low threshold current densities", Opt. Express 20,, 2012, 22181-22187.
Li, et al., "Monolithic integration of GaAs/InGaAs lasers on virtual Ge substrates via aspect-ratio trapping", J. Electrochem. Soc, 156, 2009, H574-H578.
Liang, et al., "Recent progress in lasers on silicon", Nat. Photonics 4,, 2010, 511-517.
Liang, et al., "Teardrop reflector-assisted unidirectional hybrid silicon microring lasers", IEEE Photon. Technol. Lett., 24, 2012, 1988-1990.
Lin, et al., "High performance continuous wave 1.3 um quantum dot lasers on silicon", Appl. Phys. Lett. 104, 2014, 041104.
Linder, et al., "Self-organized Ino.;Gao.oAs quantum-dot lasers grown on Si substrates", Appl. Phys. Lett. 74, 1999, 1355-1357.
Liu, et al., "Long-wavelength InAs/GaAs quantum-dot laser diode monolithically grown on Ge substrate", Nat. Photonics 5, 2011, 416-419.
Liu, et al., "MBE growth of P-doped 1.3 um InAs quantum dot lasers on silicon", J. Vac. Sci. Technol. B32, 02Cl08, 2014.
Liu, et al., "ReliabiliDJ of LnAs/GaAs quantum dot lasers epitaxially grown on silicon", IEEE J. Sel. Top. Quantum Electron. 21, 2015, 1900708.
Livshits, et al., "High efficiency diode comb-laser for DWDM optical interconnects", IEEE Optical Interconnects Conference, 2014, 83-84.
Mi, et al., "High performance quantum dot lasers and integrated optoelectronics on Si", Proc. IEEE 97, 2009, 1239-1249.
Miller, "Device requirements for optical interconnects to silicon chips", Proc. IEEE 97, 2009, 1166-1185.
Moore, et al., "Reduced surface sidewall recombination and diffusion in quantum-dot lasers", IEEE Photon. Technol. Lett., 18, 2006, 1861-1863.
Petroff, et al., "Defect structure introduced during operation of heterojunction GaAs lasers", Appl. Phys. Lett., 23, 1973, 469--471.
Roelkens, et al., "III-V/silicon photonics for on-chip and intra-chip optical interconnects", Laser Photon. Rev. 4, 2010, 751-779.
Tanabe, et al., "1.3 1-1m InAs/GaAs quantum dot lasers on SOI waveguide structures", CLEO: Science and Innovations (Optical Society of America, 2014), paper STh1G-6., 2014.
Tanabe, et al., "High temperature 1.3 Jlm InAs/GaAs quantum dot lasers on Si substrates fabricated by wafer bonding", Appl. Phys. Express 6, 2013, 082703.
Tanabe, et al., "III-V/Si hybrid photonic devices by direct fusion bonding", Sci Rep., 2, 2012, 349.
Ueda, et al., "Materials and Reliability Handbook for Semiconductor Optical and Electron Devices", Springer, 2013.
Urino, et al., "First demonstration of a thermal silicon optical interposers with quantum dot lasers operating up to 125°C.", J. Lightwave Technol. 33, 2014, 1223-1229.
Wang, et al., "1.3-jlm InAs/GaAs quantum-dot lasers monolithically grown on Si substrates", Opt. Express 19, 2011, 11381-11386.
Wirths, et al., "Lasing in direct-bandgap GeSn alloy grown on Si", Nat. Photonics 9, 2015, 88-92.
Yablonovitch, et al., "Nearly ideal electronic properties of sulfide coated GaAs surfaces", Appl. Phys. Lett., 51, 1987, 439-441.

(56) References Cited

OTHER PUBLICATIONS

Yang, et al., "High-performance Ino 5Gaor;As/GaAs quantum-dot lasers on silicon with multiple layer quantum-dot dislocation filters", IEEE Trans. Electron Devices 54, 2007, 2849-2855.

Zamek, et al., "Micro-resonator with metallic mirrors coupled to a bus waveguide", Opt Express, 19, 2011, 2417-2425.

Zhang, et al., "Removal of threading dislocations from patterned heteroepitaxial semiconductors by glide to sidewalls", J. Electron. Mater., 27, 1998, 1248-1253.

International Search Report and Written Opinion for PCT /U S20 17/035225, Aug. 11, 2017.

Liu et al., "Quantum Dot Lasers for Silicon Phonetics", Phonetics Research, vol. 3, No. 5, Oct. 2015 (Oct. 2015).

Kataria, H., et al., "Towards a monolithically integrated III-V Laser on silicon: optimization of multi-quantum well growth on InPo", Semiconductor Science and Technology, !IOP Publishing Ltd., GB, vol. 28, No. 9. (2013).

Wu, Jiang, et al., Electrically pumped continuous-wave 1.3-m InAs/GaAs quantum dot lasers monolithically grown on Si substrates, IET Optoelectro, The Institution of Engineering and Technology, Michael Faraday House, Six Hills Way, Stevenage, Herts. SG1 2AY, UK, vol. 8, No. 2 (2014).

* cited by examiner

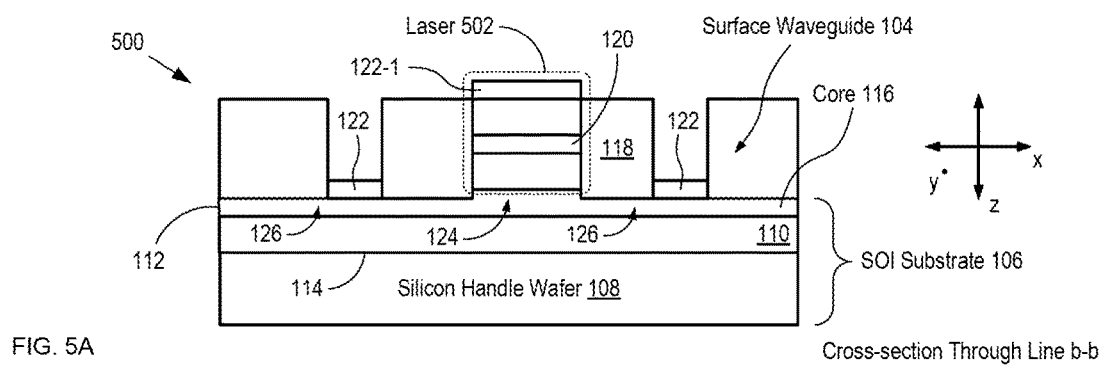
FIG. 5A      Cross-section Through Line b-b
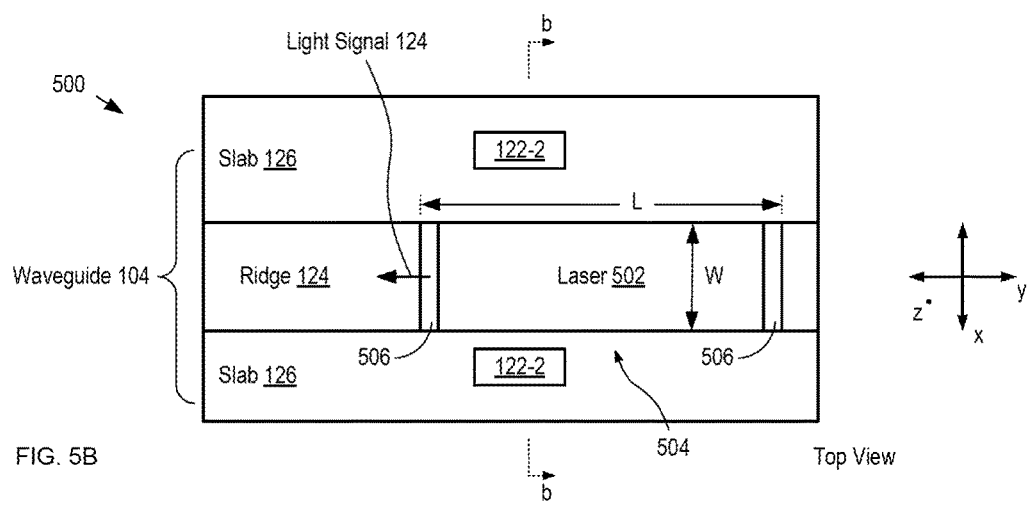
FIG. 5B      Top View

INTEGRATION OF DIRECT-BANDGAP OPTICALLY ACTIVE DEVICES ON INDIRECT-BANDGAP-BASED SUBSTRATES

CROSS REFERENCE TO RELATED APPLICATIONS

This application is a National Stage Application of PCT/US2017/035225, filed on May 31, 2017, which claims benefit of U.S. Provisional Application No. 62/345,535, filed on Jun. 3, 2016 in the United States and which applications are incorporated herein by reference. A claim of priority to all, to the extent appropriate, is made.

STATEMENT REGARDING FEDERALLY SPONSORED RESEARCH

This invention was made with Government support under Contract HR0011-12-C-0006 awarded by Defense Advanced Research Projects Agency (DARPA). The Government has certain rights in the invention.

FIELD OF THE INVENTION

The present invention relates to semiconductor device fabrication in general, and, more particularly, to integration of direct-bandgap materials on substrates comprising indirect bandgap materials.

BACKGROUND OF THE INVENTION

A photonic integrated circuit (PIC) is an integrated optical system that provides the generation and manipulation of light-based signals on a single substrate. A conventional PIC typically includes active optical devices (e.g., lasers, receivers, semiconductor optical amplifiers (SOA), detectors etc.), and planar lightwave circuits (PLC) comprising one or more surface waveguides arranged to provide passive optical functionality (e.g., waveguiding, power splitting, wavelength modulation and demodulation, power combining, switching, etc.). PICs are seen as key enablers in many important applications, including optical telecom and datacom, sensors, light projection, high performance computing, space-based communications, and the like.

One of the most common PIC configurations is that of photonic devices and/or photonic integrated circuits disposed on silicon-based substrates (often referred to as "silicon photonics"). Silicon photonics leverages the well-established large-area processing capabilities of CMOS integrated circuitry, thereby promising low-cost, high-volume solutions. In addition, the use of a silicon substrate enables the addition of microelectronic circuitry to a PIC, thereby enabling augmentation of the optical functionality of a PIC with complex electrical functionality.

Unfortunately, the development of such PIC configurations is complicated by the fact that silicon has an indirect bandgap; therefore, it is not well suited for use in the active optical devices needed for PICs to fully function. As a result, current implementations of silicon-based PICs rely on the use of compound-semiconductor-based photonic devices (e.g., lasers, modulators, semiconductor optical amplifiers, etc.) that are wafer bonded (heterogeneous integration) or coupled externally (hybrid integration) to a silicon substrate comprising the passive optical elements, such as one or more PLCs and/or silicon-based photonic elements (e.g., detectors, etc.). Such approaches require the use of expensive compound-semiconductor native substrates on which the photonic devices are grown via epitaxial growth processes.

To date, the commercial success of heterogeneous- and hybrid-integrated PICs has been limited by the high cost of compound-semiconductor substrates as compared to silicon-based substrates, as well as the cost and complexity of the extra processing steps associated with the integration of the active devices with the silicon-based passive optical devices.

Epitaxial growth of compound-semiconductor materials directly on a silicon substrate (i.e., "hetero-epitaxial growth") has been pursued in the prior-art as an alternative to heterogeneous- and hybrid-integration. It is particularly attractive because the realization of epitaxially integrated active photonic devices with silicon-based substrates would enable both cost reduction as well as performance improvements for commercial PICs, since it would eliminate the need for the smaller and relatively more expensive native compound-semiconductor substrates. Furthermore, it enables improved scalability. The scalability of direct epitaxial growth on silicon-based substrates is limited to the size of the largest available silicon-based substrates, while the scalability of heterogeneous- and hybrid-integration approaches is limited by the size of the commercially available native compound-semiconductor substrates on which the active optical devices are grown. The largest silicon-based substrates available today are twice the diameter of the largest compound-semiconductor substrates.

Unfortunately, good hetero-epitaxially grown active optical devices are difficult to achieve. Hetero-epitaxially grown material is known to have notoriously high defect densities, which arise due to the mismatch between the lattice constants of the grown material and the substrate on which it is grown. As the thickness of the hetero-epitaxially grown layer grows beyond a "critical thickness" inversely proportional to the mismatch in lattice constants and typically on the order of a few nanometers (required to support quantum wells and optical gain, for example), threading dislocations form in the material, thereby compromising its quality. As a result, lasers grown hetero-epitaxially on silicon tend to degrade rapidly and have extremely short lifetimes. It is unlikely, therefore, that prior-art hetero-epitaxial-growth approaches to forming PICs will ultimately result in the rapid design and deployment of the broad range of low-cost components demanded by the rapidly expanding application space.

As a result, there remains a need for a simple, low-cost approach to integrating direct-bandgap-material-based devices and indirect-bandgap-material-based substrates to form practical, commercially viable photonic integrated circuits.

SUMMARY OF THE INVENTION

The present invention enables a low-cost, highly scalable approach to integrating a compound-semiconductor laser or light source with silicon-photonic circuitry. Embodiments of the present invention mitigate some of the costs and disadvantages associated with prior-art heterogeneous and/or hybrid integration techniques by employing direct epitaxial deposition of compound-semiconductor material onto silicon-based substrates. The present invention provides an enabling technology for the low-cost fabrication of optically active devices on indirect-bandgap substrates, as well as their optical coupling to surface waveguides disposed on the substrates. The present invention is particularly well suited to the integration of compound semiconductor optically active devices on silicon substrates comprising silicon-based and/or compound-semiconductor-based surface waveguides.

An illustrative embodiment of the present invention is a silicon-photonic circuit comprising a compound-semiconductor-based quantum-dot laser structure that is epitaxially grown on a silicon-on-insulator substrate, such that the laser structure resides on the silicon handle substrate and the active region of the laser is aligned with a surface waveguide formed in the silicon device layer of the silicon-on-insulator substrate. By virtue of their relative alignment, light generated by the laser is efficiently coupled into the waveguide. In some embodiments, a silicon-photonic circuit includes a compound-semiconductor photonic device other than a laser, such as a detector, modulator, etc. In some embodiments, a compound-semiconductor structure is based on quantum structures other than quantum dots, such as quantum wires, quantum dashes, and the like.

The quantum-dot laser includes an active region having one or more light-emitting layers, where, in each light-emitting layer, one or more light-emitting regions are embedded in a confinement layer comprising a material whose bandgap is greater than that of the material of the light-emitting regions. In the illustrative embodiment, the light-emitting regions are quantum dots. In some embodiments, the active region includes only a single light-emitting layer that comprises a single light-emitting region, such as a quantum dot, quantum dash, or quantum wire. In some embodiments, the active region includes a plurality of light-emitting layers, each comprising a single light-emitting region. Each confinement layer containing the quantum-dots is separated from its nearest neighbors by a barrier layer. In some embodiments, the barrier layers are made of the same material as the confinement layers, thereby forming a substantially continuous volume of confinement-layer material that encases multiple layers of quantum dots.

In contrast to quantum-dot lasers known in the prior art, compound-semiconductor photonic devices of the present invention employ material layers (e.g., one or more of its confinement layers, barrier layers, buffer layers, cladding layers, contact layers, etc.) that are characterized by defect-related trap level that are located at energy levels other than the center of the bandgap of the material. Preferably, the defect-related trap level are located far away from the center of the bandgap (i.e., near the band edges) and, most preferably, lie either above the conduction-band edge or below the valence-band edge. As a result, the defect-related trap level substantially suppress recombination-enhanced defect-reaction-driven degradation in the laser.

The quantum-dot laser structure is epitaxially grown directly on the top surface of the silicon handle wafer via hetero-epitaxial growth. The growth region on the substrate surface is formed by removing the device layer and buried-oxide layer via etching to form a trench. The device layer is also patterned to define a surface waveguide that terminates at the edge of the trench. The layers of the quantum-dot laser structure are dimensioned and arranged such that the height of the active region of the laser is aligned with the silicon core of the surface waveguide, thereby enabling high coupling efficiency between the laser and the waveguide.

In some embodiments, the laser structure is grown adjacent to, or on top of, a surface waveguide such that light emitted by the active region is evanescently coupled into the surface waveguide, thereby creating a hybrid optical mode. In some embodiments, the optical mode is converted back and forth from a hybrid optical mode to a silicon waveguide mode via vertical tapers. In some embodiments, the surface waveguide is a silicon-based waveguide. In some embodiments, the surface waveguide comprises a material other than silicon, such as silicon nitride, silicon dioxide, one or more compound semiconductors, and the like.

In some embodiments, the compound semiconductor structure comprises III-V compound semiconductors. In some embodiments, the compound semiconductor structure comprises II-VI compound semiconductors.

In some embodiments, the substrate is other than a silicon-on-insulator substrate. In some embodiments, the substrate includes another silicon-based material, such as silicon-germanium, silicon-carbide, and the like. In some embodiments, the substrate comprises an indirect-bandgap semiconductor other than a silicon-based semiconductor.

An embodiment of the present invention is an apparatus comprising: a substrate (106) comprising a first semiconductor (112) that has an indirect bandgap; and a first device (102) that is an active optical device, the first device comprising an active region (120) having: at least one light-emitting region (206) that is dimensioned and arranged to provide at least two degrees of spatial and electrical charge-carrier confinement, wherein the at least one light-emitting region comprises a first material (218) that is a direct-bandgap compound semiconductor having a first bandgap ($Eg_1$); and a confinement layer (208) that surrounds each of the first plurality of light-emitting regions, wherein the confinement layer comprises a second material (220) having a second bandgap ($Eg_2$) that is greater than the first bandgap; wherein the first device and the substrate are monolithically integrated.

Another embodiment of the present invention is an apparatus comprising: a substrate (106) comprising single-crystal silicon; and a laser structure (102) comprising an active region (120) having: a first plurality of light-emitting regions (206), each light-emitting region of the first plurality thereof comprising a first material (218) that is a first compound semiconductor having a first bandgap ($Eg_1$); and a first confinement layer (208) that surrounds each of the first plurality of light-emitting regions, wherein the first confinement layer comprises a second material (220) that is a second compound semiconductor having a second bandgap ($Eg_2$) that is greater than the first bandgap, and wherein the second material is characterized by a defect-related trap level ($E_{defect}$) that substantially suppresses recombination-enhanced defect-reaction-driven degradation of the laser structure; wherein at least one of the first plurality of light-emitting regions is a structure selected from the group consisting of quantum dots, quantum wires, and quantum dashes; wherein the first plurality of light-emitting regions and the first confinement layer collectively provide at least one of spatial and electrical charge-carrier confinement; and wherein the laser structure and the substrate are monolithically integrated and in direct contact.

Yet another embodiment of the present invention is a method for forming a photonic integrated circuit (PIC) comprising: forming an active optical device (102) on a substrate (106) that comprises an indirect-bandgap semiconductor, the active optical device comprising an active region (120) having: at least one light-emitting region (206) that comprises a first material (218) that is a direct-bandgap semiconductor having a first bandgap ($Eg_1$); and a confinement layer (208) that surrounds the at least one light-emitting region, wherein the confinement layer comprises a second material (220) having a second bandgap ($Eg_2$) that is greater than the first bandgap; wherein the at least one light-emitting region and the confinement layer are collectively operative for providing at least one of spatial and electrical charge-carrier confinement in at least two dimensions; and providing a surface waveguide (104) that is disposed on the substrate; wherein the active region and the surface region are optically coupled; and wherein at least a portion of the active optical device is formed via epitaxial growth on the substrate.

BRIEF DESCRIPTION OF THE DRAWINGS

FIGS. 5A-B depict schematic drawings of cross-sectional and top views, respectively, of a silicon-based PIC in accordance with a first alternative embodiment of the present invention.

DETAILED DESCRIPTION

Figure 1A:
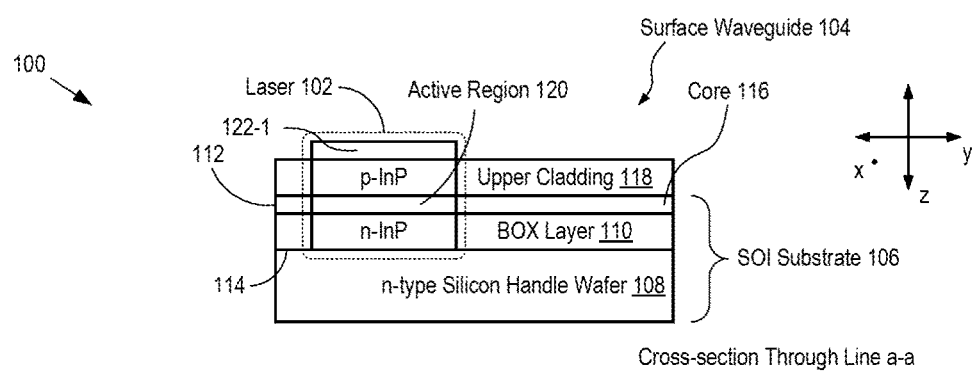
FIGS. 1A-B depict schematic diagrams of cross-sectional and top views, respectively, of a silicon-based PIC in accordance with an illustrative embodiment of the present invention.
Figure 1B:
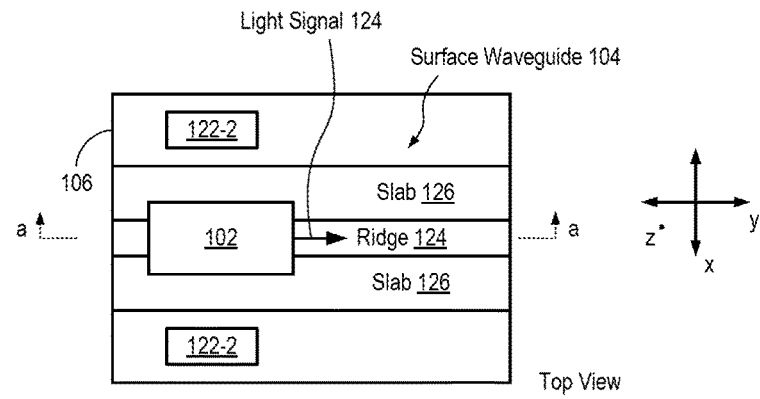

FIGS. 1A-B depict schematic diagrams of cross-sectional and top views, respectively, of a silicon-based PIC in accordance with an illustrative embodiment of the present invention. The view depicted in FIG. 1A is cross section of PIC 100 that is taken through line a-a of FIG. 1B. PIC 100 includes laser 102 and surface waveguide 104, which are monolithically integrated on substrate 106. For the purposes of this Specification, including the appended claims, the term "monolithically integrated" is defined as formed (e.g., epitaxially grown and subsequently patterned, etc.) on a common substrate. The term monolithically integrated explicitly excludes hybrid integration wherein different elements are completely formed on separate substrates and subsequently mechanically joined or bonded after their formation.

It should be noted that, although the description provided herein is directed to a laser integrated with a silicon waveguide, the present invention is applicable to the integration of any suitable active optical device with any waveguide disposed on an indirect-band-gap substrate.

Substrate 106 is a conventional silicon-on-insulator (SOI) substrate comprising handle wafer 108, buried-oxide (BOX) layer 110, and device layer 112.

Handle wafer 108 is an n-type single-crystal silicon wafer having surface 114.

BOX layer 110 is a layer of silicon dioxide that is disposed directly on surface 114.

Device layer 112 is a layer of single-crystal silicon having a thickness of approximately 220 nm. It should be noted that device layer 112 can have any practical thickness suitable for the core layer of a surface waveguide. Device layer 112 is disposed directly on the top surface of BOX layer 110 and patterned in conventional fashion to define core 116 of surface waveguide 104. In some embodiments, device layer 112 comprises a material other than silicon. Device layer 112 is patterned to define surface waveguide 104.

Surface waveguide 104 is a conventional oxide-cladded silicon-core ridge waveguide that includes silicon core 116, BOX layer 110, and upper cladding 118, which is a layer of silicon dioxide formed in conventional fashion. BOX layer 110 acts as a lower cladding and upper cladding 118 acts as an upper cladding for the surface-waveguide structure. One skilled in the art will recognize, after reading this Specification, that surface waveguide 104 can be any conventional surface waveguide comprising any suitable core and cladding materials, such as silicon nitride, silicon oxide, silicon oxynitride, germanium, compound semiconductors, a different semiconductor, lithium niobate, and the like.

Surface waveguide 104 comprises ridge portion 124 and slab region 126. In the depicted example, ridge portion 124 has a width of approximately 500 nm and a thickness of approximately 220 nm. Slab portion is formed by etching device layer 112 in the regions outside of the ridge to a thickness of approximately 100 nm. In some embodiments, surface waveguide 104 has a waveguide structure other than a ridge waveguide, such as a channel waveguide, slab waveguide, rib waveguide, multi-layer-core waveguide, and the like.

Laser 102 is a compound-semiconductor-based quantum-dot laser that is epitaxially grown on surface 114 of silicon handle wafer 108. Laser 102 includes buffer layer 210, III-V layers 212 and 214, active region 120, and electrical contacts 122-1 and 122-2. It should be noted that, for clarity, n-contacts 122-2 are not shown in FIG. 1A and p-contact 122-1 is not shown in FIG. 1B. In the depicted example, laser 102 is dimensioned and arranged such that active region 120 resides at substantially the same height above surface 114 as core 116. Active region 120 is described in more detail below and with respect to FIGS. 2A-B. One skilled in the art will recognize that laser 102 includes mirrors that define its optical cavity; however, for clarity, these mirrors are omitted from FIGS. 1 and 2.

Buffer layer 210 is a conventional buffer layer comprising material 216. III-V layers 212 and 214 are representative of a plurality of different conventional layers of the structure of laser 102, such as cladding layers, contact layers, etc.

One skilled in the art will recognize that, by virtue of the fact that laser 102 is epitaxially grown on surface 114, laser 102 and surface 114 are in direct contact at interface 222. When a material is characterized by a lattice constant different from the underlying material on which it is being epitaxially grown (typically referred to as "hetero-epitaxial growth"), the lattice mismatch is typically accommodated by an induced strain in the first few monolayers of grown layer near interface 222, by the development of dislocations (i.e., defects) in the grown layer at or near interface 222, or some combination thereof. In the case of induced strain, the first few atomic layers of the epitaxially grown material (i.e., the first few atomic layers of buffer layer 210) are coherently strained so that their lattice constant becomes matched that of the underlying "seed crystal" (i.e., the crystal lattice of surface 114 of substrate 108), thereby accommodating the lattice constant difference in their bulk materials. In the case of defect formation, misfit dislocations and/or "missing" rows of atoms develop to accommodate the mismatch. Dislocation-based accommodation is more likely when the difference between the lattice constants is fairly large (e.g., 4-8%).

By virtue of their matching height above surface 114, when laser 102 is activated by the application of a voltage between electrical contacts 122 subsequently causing carriers to be injected into the active region 120, active region 120 generates light signal 124, which is readily optically coupled into surface waveguide 104. In some embodiments, the compound-semiconductor structure is selectively grown in a trench or groove etched into handle wafer 108 such that the compound-semiconductor-material/silicon interface is on surface 114 or recessed into the handle wafer. In the depicted example, the growth region of surface 114 is exposed by removing a portion of each of BOX layer 110, device layer 112, and upper cladding 118 in suitable etch processes. In some embodiments, surface 114 is modified (e.g., treated to create an off-axis growth region, etc.) to facilitate high-quality epitaxial growth of the layers of laser 102.

In the depicted example, laser 102 comprises III-V compound-semiconductor-based layers and handle wafer 108 comprises single-crystal silicon; however, one skilled in the art will recognize that other direct-bandgap semiconductor materials, such as II-VI semiconductors, and the like, can be used in one or more of the constituent layers of the laser structure. Furthermore, as noted above, while the materials used in the active region of an active optical device in accordance with the present invention are preferably direct-bandgap semiconductors, one or more of the other constituent layers of the active optical device can include one or more materials that are indirect-bandgap semiconductors without departing from the scope of the present invention. In similar fashion, handle wafer 108 can comprise other indirect-bandgap semiconductor materials without departing from the scope of the present invention.

Suitable techniques for epitaxially growing the semiconductor material of laser 102 on surface 114 include, without limitation, MBE, MOCVD, CBE, ALE, or any combination thereof to produce one or more high-quality semiconductor layers on the surface. In addition, some or all of these growth methods are amenable to "selective-area" growth, in which crystalline material is epitaxially grown only on the exposed regions of an underlying template layer having a crystalline surface. As used herein, the term "compound semiconductor lasers" refers to any III-V semiconductor laser comprising one or more alloys of the group III and group V elements of the periodic table, as well as any II-VI semiconductor laser comprising one or more alloys of the group II and group VI elements of the periodic table. Exemplary III-V semiconductors suitable for use in embodiments of the present invention typically have the generic chemical formula of $(Al_aGa_bIn_c)_s(Bi_vAs_wP_xN_ySb_z)_t$, where $0 \leq a \leq 1$, $0 \leq b \leq 1$, $0 \leq c \leq 1$, $0 \leq w \leq 1$, $0 \leq x \leq 1$, $0 \leq y \leq 1$, $0 \leq z \leq 1$, $a+b+c=1$, $v+w+x+y+z=1$, and $s+t=1$ and may include other elemental dopants and impurities. Typically, the term "silicon based substrates" here includes, without limitation, bulk silicon (001) substrates, bulk silicon (001) substrates with an intentional miscut angle $<=10°$ towards the <111> or <110> planes (i.e., "off-axis substrates"), and SOI substrates that include a thin silicon layer (with typical thickness ≤10 microns) is separated from a bulk handle wafer by a layer of silicon dioxide ($SiO_2$) (e.g., a buried-oxide layer analogous to BOX layer 110).

One skilled in the art will recognize that compound semiconductors have various degrees of lattice mismatch, as well as polarity mismatch, with silicon. During conventional epitaxial growth of a compound semiconductor on a silicon template, these mismatches give rise to extended defects (e.g., misfit dislocations, stacking faults, anti-phase domains, etc.) at the interface between the materials, where the defect density can be quite high (typically $>10^8$ cm$^{-2}$). One skilled in the art will also recognize that such defects have non-radiative trap levels associated with them (referred to herein as "defect-related trap levels"), which typically manifest as discrete energy levels within the energy bandgap of the host material (i.e., at levels between the energy levels of its valence and conduction bands). Under normal device operation, these defect-related trap level can rob charge carriers that would otherwise exhibit radiative recombination, thereby reducing overall device efficiency. Furthermore, non-radiative recombination can also degrade device lifetime by inducing the defects to grow in size/density and/or glide within the material during device operation.

The present invention mitigates some or all of these issues through judicious material selection and/or by employing bandgap engineering that makes active region 120 more tolerant of crystalline defects that could, otherwise, give rise to device degradation.

In some embodiments, active region 120 is formed such that it includes regions of light-emitting material having multiple degrees of spatial and electronic confinement for charge carriers within the active region. Specifically, the light-emitting regions comprise a direct-bandgap semiconductor that is characterized by a first bandgap energy, $Eg_1$, and the regions are embedded within a confinement layer comprising a material having a second bandgap energy, $Eg_2$, which is higher than $Eg_1$ (i.e., $Eg_2 > Eg_1$). Light-emitting regions in accordance with the present invention can have any suitable shape, such as quantum wires (providing 2 degrees of confinement), quantum dashes (providing 2-3 degrees of confinement), quantum dots (providing three degrees of confinement), and the like. It should be noted that, while the light-emitting regions preferably include only semiconductors that have a direct bandgap, the confinement layer that surrounds them can include materials that are either direct- or indirect-bandgap semiconductors. As a result, a confinement layer in active region 120, as well as one or more of the other constituent layers (e.g., buffer layers, cladding layers, contact layers, etc.) of laser 102, can include an indirect-bandgap semiconductor without departing from the scope of the present invention.

Figure 2A:
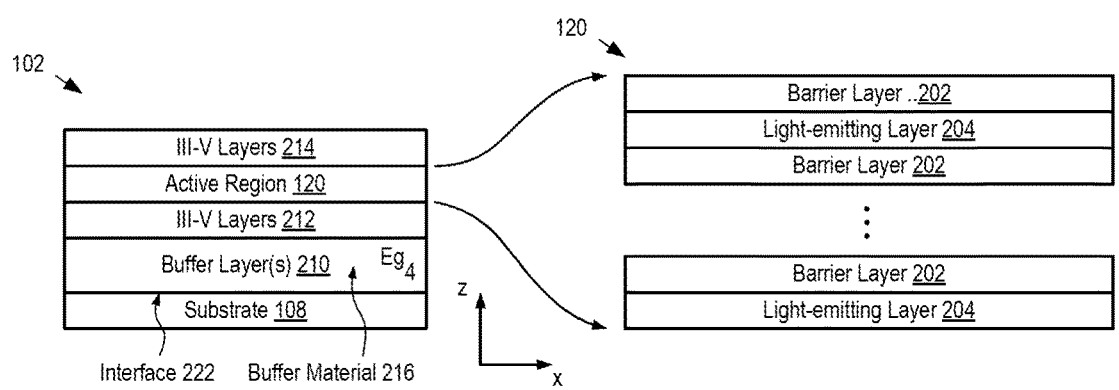
FIG. 2A depicts a schematic drawing of an enlarged view of an active region in accordance with the illustrative embodiment of the present invention.

FIG. 2A depicts a schematic drawing of an enlarged view of an active region in accordance with the illustrative embodiment of the present invention. Active region 120 includes an alternating layer stack of barrier layers 202 and light-emitting layers 204.

Each of barrier layers 202 is a layer of compound-semiconductor material suitable for separating adjacent light-emitting layers in active region 120. Each barrier layer 202 comprises a material having a third bandgap energy, $Eg_3$, which is greater than that of the material of the light-emitting regions within light-emitting layers 204. In some embodiments, barrier layers 202 are analogous to the barrier layers of a multiple-quantum-well structure. In some embodiments, barrier layers 202 are made of the same material as the confinement material included in light-emitting layers 204.

Figure 2B:
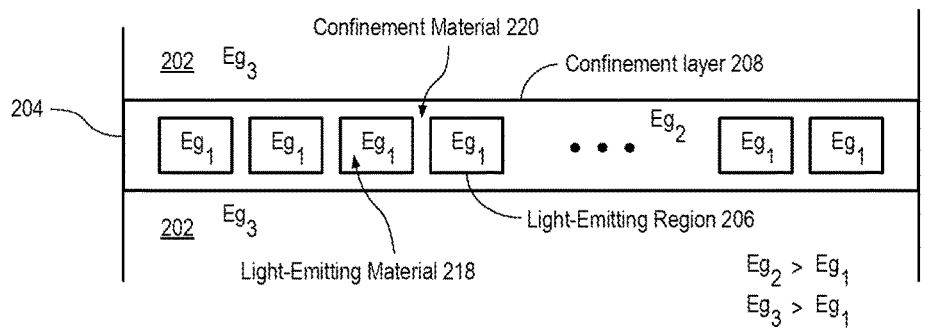
FIG. 2B depicts a schematic drawing of an enlarged view of a light-emitting layer in accordance with the illustrative embodiment.

FIG. 2B depicts a schematic drawing of an enlarged view of a light-emitting layer in accordance with the illustrative embodiment. Each of light-emitting layers 204 includes a plurality of light-emitting regions 206 embedded within a confinement layer 208.

In the depicted example, light-emitting regions 206 are quantum dots comprising light-emitting material 218. In some embodiments, light-emitting regions 206 have a different structure, such as quantum wires, quantum dashes, and the like.

The use of light-emitting regions that give rise to three-dimensional charge-carrier confinement provides several benefits to device performance. It provides a reduced sensitivity to crystalline defects relative to commercially dominant quantum-well-based technologies. This promotes higher yield and performance improvements, such as lower threshold currents, increased temperature stability of lasing threshold, reduced sensitivity to reflections, reduced surface recombination currents, higher catastrophic optical damage thresholds, and longer lifetimes.

Light-emitting regions 206 enable efficient radiative capture and three-dimensional confinement of injected carriers in the active region, leading to reduced non-radiative recombination rates. As a result, radiative recombination dominates in active region 120, particularly when the density of the light-emitting regions is much greater than the density of defects, thereby enabling efficient generation of light.

Confinement layer 208 comprises confinement material 220, which is a material having an energy bandgap that is greater than that of light-emitting material 218. Within confinement layer 208, confinement material 220 substantially completely surrounds the light-emitting regions in each light-emitting layer. In the depicted example, light-emitting material 218 comprises indium-gallium-arsenide $[(In_xGa_y)_{0.5}As_{0.5}]$, where x+y=1 and confinement material 220 comprises indium-aluminum-gallium-arsenide-phosphide $[(In_xAl_yGa_z)_{0.5}((As_uP_v)_{0.5})]$, where x+y+z=1, u+v=1, and x≥0.5.

Confinement material 220 and the size of light emitting regions 206 are selected such that active region 120 emit light having a wavelength of approximately 1550 nm. In some embodiments, these parameters are selected such that the laser emits light having another wavelength within the range from approximately 1100 nm to approximately 2000 nm.

One skilled in the art will recognize, after reading this Specification, that myriad materials are suitable for use in each of the light-emitting material and confinement material within the scope of the present invention. Examples of alternative materials suitable for use in confinement material 220 in the depicted example include, without limitation, indium phosphide (InP), indium-aluminum-gallium-arsenide (InAlGaAs), and the like.

It is another aspect of the present invention that the lifetime of a direct-bandgap-semiconductor-based active optical device formed on an indirect-bandgap semiconductor can be improved by forming its layers residing outside of the active region of materials that exhibit less device degradation due to recombination enhanced defect reactions.

There are two major factors in defect-related laser degradation:

i. recombination enhanced defect reactions (REDR)—under carrier injection, when carriers are trapped by a defect and subsequently recombine non-radiatively at the defect, the energy released (phonons/heat) can help facilitate the movement and growth of existing defects; and ii. thermal stress/strain related—during cool-down from the growth temperature of III-V semiconductors on silicon, the difference in thermal expansion coefficients between silicon and III-V layers ($\alpha_{Si}$-$\alpha_{III-V}$) results in thermal stress which may cause additional dislocation formation, as well as leaving a residual stress in the material which may further exacerbate lifetime issues as dislocation motion is enhanced under the presence of stress/strain fields (specifically, dislocation velocity v can be approximated as $$v = v_0 \sigma^m \exp\left(-\frac{E}{kT}\right),$$

where σ is the stress field within the material and the exponent m is usually between 1-2).

With respect to REDR, for a given electrically pumped semiconductor laser operating under a current bias I, a sub-unity fraction ($\eta_i$) of the charge carriers of this current reaches active region 120, where the charge carriers contribute to light emission.

A substantial portion of the charge carriers of the current that does not reach the active region—$(1-\eta_i)*I$—may be trapped by defects in the layers external to active region 120 (i.e. layers 210, 212, 214 and/or barrier layers 202). These carriers undergo Shockley-Read-Hall (non-radiative) recombination and contribute to material degradation via recombination enhanced defect reactions. The lower the operating current of the laser, the slower the degradation rate, which suggests that lasers with lower thresholds are preferred. Active regions that comprise quantum-dot light-emitting regions have a lower intrinsic threshold current density as compared to other semiconductor lasers (e.g. quantum wells or wires); therefore, using quantum dots for light-emitting regions 206 is preferred in some embodiments of the present invention.

The Shockley-Read-Hall recombination rate very much depends on the nature of the defect—specifically the energy level associated with its dangling bonds, which is a function of the chemical make-up of the material. Lower non-radiative recombination rates are associated with defect energy levels that are further away from the middle of the bandgap. It is another aspect of the present invention, therefore, that the probability of non-radiative recombination in the active region of an optically active device can be reduced by forming the device such that defect-related trap levels are located outside of the energy bandgap of the material; preferably, in the conduction or valance band.

As a result, the materials for the layers of an active optical device in accordance with the present invention are selected to mitigate Shockley-Read-Hall recombination, for example, by controlling alloy composition. Specifically, in some embodiments of the present invention, the probability of non-radiative recombination in the active region of an optically active device is reduced by forming the device such that defect-related trap levels are located substantially away from the center or outside of the energy bandgap of the material (i.e., in the conduction or valance band). It can be shown that, for example, InP compounds are less susceptible to rapid degradation due to recombination enhanced defect growth or climb, compared to GaAs based compounds;

therefore, in some embodiments of the present invention, the fraction of InP (and related compounds) in the device structure is increased to yield increased operating lifetimes of the devices as compared to prior-art active devices having comparable dislocation density and less total InP fraction within its layer structure. Specifically, embodiments of the present invention employ InP-related compounds as the host matrix in active region 120, which mitigates the impact of defects both inside and outside of the active region.

Furthermore, in some embodiments, the material of the layers outside of active region 120 is selected to mitigate thermal stresses during cool down. Thermal stress is roughly approximated as: $\Delta\alpha\Delta T$, where $\Delta\alpha=\alpha_{sub}-\alpha_{epi}$, is the thermal expansion coefficient difference between the substrate and the epitaxially grown layers, and $\Delta T=T_{growth}-T_{operating}$ is the difference between the growth temperature and normal operating temperature of the final material, which is typically around room temperature. Thermal stress is therefore mitigated by using lower growth temperatures $T_{growth}$, and lower coefficients of mismatch between the epi-layers and the silicon substrate $\Delta\alpha$. Thermal stress can also be mitigated by proper selection of a material for the buffer layer such that the thermal stresses generated between the buffer layer and the substrate have the opposite sign to the stress generated between the buffer layer and the upper epilayers, which enables them partially (or fully) negate each other. For example, in one embodiment, the buffer layer may comprise of an initial layer of GaAs, then a subsequent layer of InP (e.g., InP/GaAs/Si). Given that $\alpha_{Si}<\alpha_{InP}<\alpha_{GaAs}$, the thermal stress generated between GaAs/Si is tensile in nature because GaAs will contract faster than silicon upon cooldown, while the InP/GaAs stress is compressive in nature because InP contracts slower than GaAs, with the two stresses partially negating each other.

Still further, in some embodiments, the impact of crystalline defects is mitigated by using materials in the structure of laser 102 outside of active region 120 in which crystalline defects are less active relative to other materials. The "activity level" of a defect—in this case quantified by the non-radiative recombination rate at the defect—varies depending on the host matrix material and nature of the defect. Embodiments of the present invention employ materials in which the energy levels associated with crystalline defects in them is positioned further away from the middle of the energy bandgap of that material (e.g. closer to the band edges), the non-radiative recombination rate at the crystalline defect decreases exponentially, and thus their impact on efficiency as well as lifetime can be substantially minimized. In fact, preferably, the energy "trap" levels associated with the defects are preferably located entirely outside of the bandgap of the material of the layer in which it exists (i.e., in either its conduction band or valence band). For example, in accordance with the present invention, material 216 of buffer layer 210, which is characterized by energy bandgap, $Eg_4$, could have a defect that gives rise to a defect-related trap level located other than at the center of $Eg_4$ and, preferably, within either its conduction band, $E_c(216)$, or its valence band, $E_v(216)$. One skilled in the art will recognize that this relationship between a defect-related trap level and the energy bandgap of the material in which it resides is also applicable to any constituent layer of III-V layers 212 and 214 as well.

In the depicted example, the outer layers of laser 102 comprise InP and $(InAlGa)_{III}(AsP)_V$ alloy compositions that are lattice matched to InP. InP and its related compounds can be grown at significantly lower growth temperatures compared to GaAs, and also have a smaller thermal expansion mismatch with silicon, both of which will contribute to reduced thermal stress upon cool-down from growth temperature. As a result, the In(Ga)As quantum dots in active region 120 provide efficient light generation, while a high indium and/or phosphorous content in the layers other than the active region suppress recombination-enhanced defect-reaction-driven degradation of the completed laser device.

In other words, it is an aspect of the present invention that the usage of a quantum dot active region enables the compound-semiconductor material to lase efficiently in the presence of dislocations—through conversion of the fraction of injected current reaching the active region ($\eta_i*I$) into useful photons—and suppresses degradation in the active region. The fraction of current not reaching the active region $(1-\eta_i)*I$ might contribute to defect-related degradation external to the active region, but can be suppressed through careful selection of the material external to the active region with due consideration for the lattice constant, thermal expansion coefficients, and alloy composition/deep level states. The sum of the parts is an efficient compound-semiconductor laser (e.g., a III-V laser) that is epitaxially deposited on indirect-bandgap-semiconductor-based substrates (e.g., silicon-based) capable of long operating lifetimes.

Although there are many material combinations that can be used in the structure of laser 102 without departing from the scope of the present invention, some examples of suitable material combinations include, without limitation:

a light-emitting region composition of $(In_xGa_y)_{0.5}As_{0.5}$, where x+y=1 and 0.3≤x≤1; and a confinement material composition of $(In_xAl_yGa_z)_{0.5}As_{0.5}$ that is lattice matched to InP (where x+y+z=1 and the indium composition fraction 'x' of the group III elements is between 0.523 to 0.532); and a barrier layer having a composition of:
  that of the confinement material; or
  a different composition of $(In_xAl_yGa_z)_{0.5}As_{0.5}$ that is lattice matched to InP (preferably, where x+y+z=1 and x is no greater than 0.55); or
  a composition of $In_{1-x}Ga_xAs_yP_{1-y}$ that is lattice matched to InP (0<x<0.46).

outer compound-semiconductor layer compositions (preferably, having an indium composition no less than 50%):
  InP (indium composition 50% exactly); or
  $In_{1-x}Ga_xAs_yP_{1-y}$ lattice matched to InP where x+y=1 (0<x<0.47); or
  $(In_xAl_y)_{0.5}As_{0.5}$ lattice matched to InP (where x+y=1 and the indium fractional composition 'x'=0.523); or
  $(In_xAl_yGa_z)_{0.5}As_{0.5}$ lattice matched to InP (where x+y=1 and the indium fractional composition 'x' between 0.523 to 0.532); or
  any combination thereof.

buffer layer compositions of:
  GaP; or
  Ge; or
  GaAs; or
  InP; or
  any composition of $(In_xGa_y)_{0.5}As_{0.5}$, or $(In_xAl_y)_{0.5}As_{0.5}$, where x+y=1 and the indium fractional composition x on the group III site varies from 0 to 65%; or
  any combination thereof.

Figure 3:
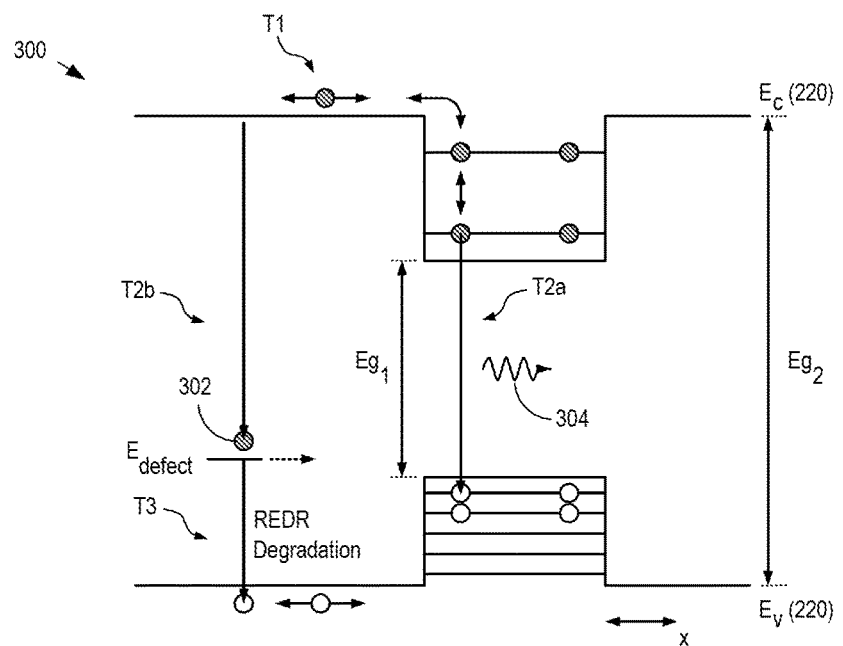
FIG. 3 depicts a schematic drawing showing some of the physical processes involved with carrier transitions in active region 120.

FIG. 3 depicts a schematic drawing showing some of the physical processes involved with carrier transitions in active region 120. Note that, for clarity, plot 300 depicts only the electron energy transitions. Further, plot 300 depicts only a single representative electron trap (i.e., trap 302) located within the bandgap of confinement material 220.

Transition T1 represents injection of a charger carrier (i.e., an electron in the depicted example) into active region 120.

Transition T2a represents a radiative transition that occurs when the electron decays via capture by a light-emitting region 206. Such a radiative transition gives rise to an emitted photon 304, whose wavelength is based on the energy lost by the electron during capture. Ideally, this energy is equal to the energy bandgap of the light-emitting material; however, one skilled in the art will recognize that, in some cases, this energy is slighter greater than the energy bandgap due to additional energy that results from spatial quantum confinement.

Transition T2b depicts an alternative transition that occurs when the electron is captured by trap 302, which arises due to a crystalline defect, as discussed above.

Once trapped, a charge carrier will typically transition to the valence band by releasing its energy via non-radiative recombination (transition T3), which can result in the growth of the defect responsible for the defect-related trap level or formation of one or more new defects. This process is typically referred to as recombination enhanced defect reactions (REDR). As a result, the likelihood of additional REDR increases and the device efficiency decreases.

As discussed above, laser 102 is dimensioned and arranged such that the longitudinal axis of active region 120 is at the same height above surface 114 as device layer 112. In other words, active region 120 and core 116 (and, therefore, surface waveguide 104) are substantially coplanar in a plane that is substantially parallel to surface 114 of handle wafer 108. As a result, light emitted by laser 102 is readily coupled into surface waveguide 104 (i.e., the laser and surface waveguide are optically coupled).

Figure 4A:
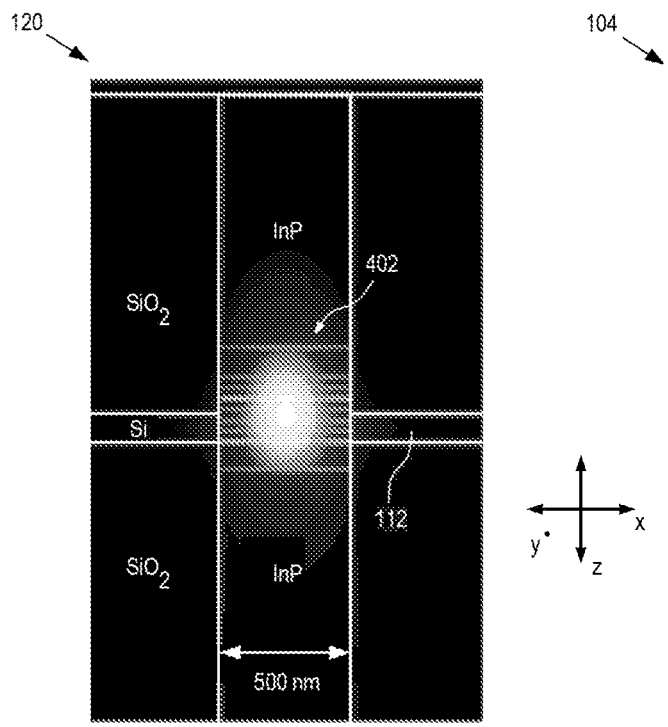
FIGS. 4A-B depicts schematic drawings of cross-sectional views of simulated TE-mode profiles within active region 120 and surface waveguide 104.
Figure 4B:
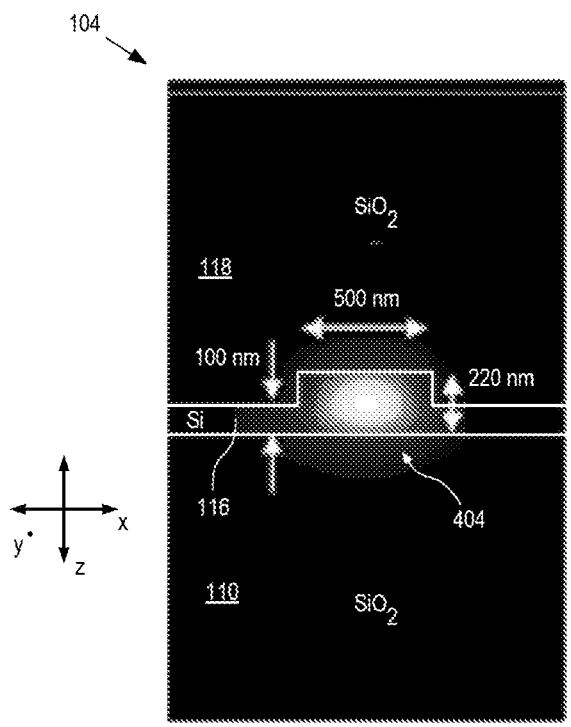

FIGS. 4A-B depicts schematic drawings of cross-sectional views of simulated TE-mode profiles within active region 120 and surface waveguide 104. Optical mode 402 is simulated for a quantum-dot configuration having seven light-emitting layers comprising quantum-dot light emitting regions embedded within their respective confinement layers. Optical mode 404 is the corresponding mode in surface waveguide 104.

In some embodiments, the structure of laser 102 is grown such that gain region 120 is adjacent to surface waveguide 104 and light emitted by the laser is evanescently coupled into the waveguide.

FIGS. 5A-B depict schematic drawings of cross-sectional and top views, respectively, of a silicon-based PIC in accordance with a first alternative embodiment of the present invention. The view depicted in FIG. 5A is transverse cross section of PIC 100 that is taken through line b-b of FIG. 5B. PIC 500 includes laser 502 and surface waveguide 104, which are monolithically integrated on SOI substrate 106.

Laser 502 is analogous to laser 102; however, laser 502 is grown directly on the top of ridge portion 124. Laser 504 also includes mirrors 506 for defining a longitudinal optical mode along the y-direction of the cavity of the laser.

Laser 502 and surface waveguide 104 overlap to collectively define coupling section 504, which has length, L, and width, W. In the depicted example, W is equal to the lateral dimension of ridge portion 124. By virtue of coupling section 504, the light generated by laser 502 is evanescently coupled with surface waveguide 104 to give rise to a hybrid optical mode within the coupling section.

Figure 6:
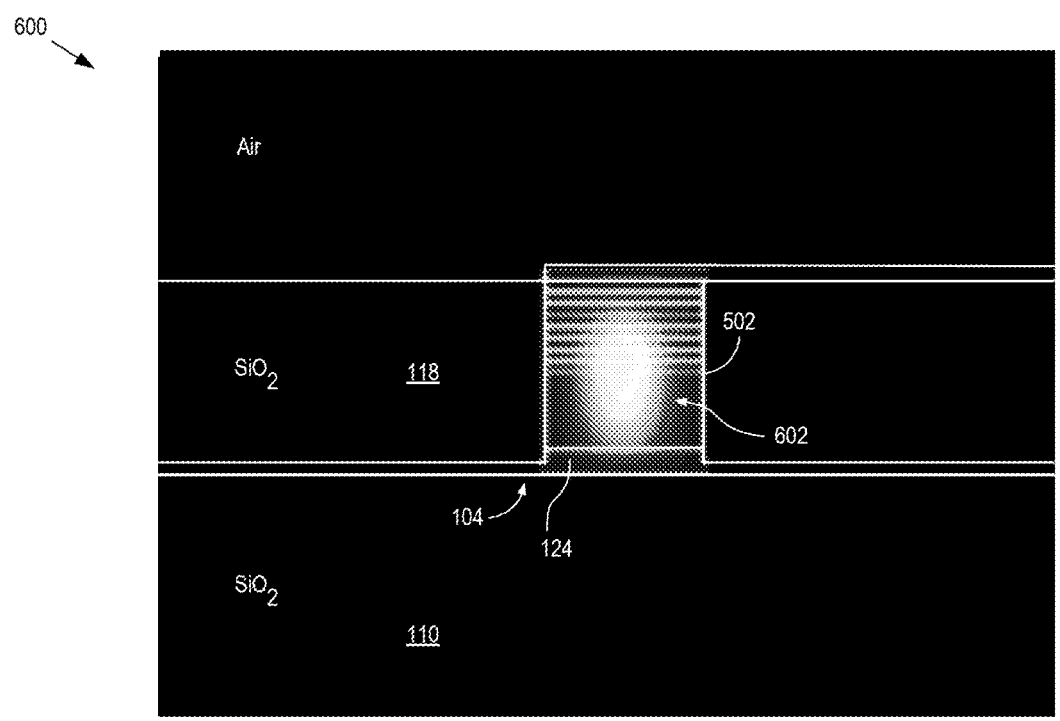
FIG. 6 depicts a plot of a simulation of the optical mode of light within coupling section 504.

FIG. 6 depicts a plot of a simulation of the optical mode of light within coupling section 504. Plot 600 shows the fundamental TE mode profile of a silicon-based PIC analogous to PIC 500; however, for an active region having five quantum dot layer. As evinced by plot 600, optical mode 602 is a hybrid mode that exists simultaneously in both laser 502 and surface waveguide 104.

Figure 7:
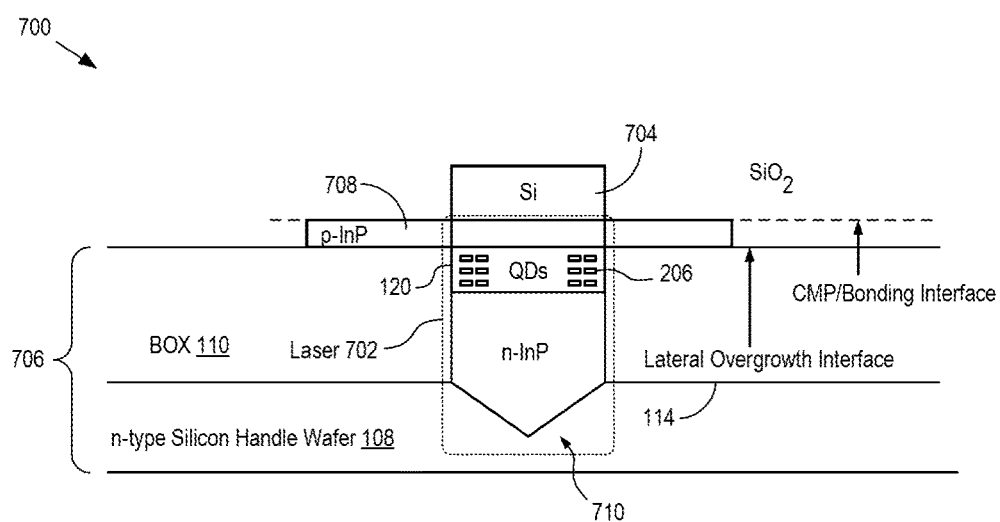
FIG. 7 depicts a schematic drawing of a cross-sectional view of a silicon-based PIC in accordance with a second alternative embodiment of the present invention.

FIG. 7 depicts a schematic drawing of a cross-sectional view of a silicon-based PIC in accordance with a second alternative embodiment of the present invention. PIC 700 includes laser 702 and surface waveguide 704, which are disposed on substrate 706.

Substrate 706 is analogous to substrate 106 described above; however, prior to the growth of laser 702, the structure of substrate 706 includes only handle substrate 108 and BOX layer 110.

To form a growth site for the structure of laser 702, portion of BOX layer 110 is removed to expose surface 114 of handle wafer 108. In the depicted example, growth site includes optional v-groove 710, which is formed in surface 114 via conventional techniques.

After hetero-epitaxial growth of the laser structure, which includes lateral overgrowth interface region 708, a silicon layer containing surface waveguide 704 is bonded to substrate 706 (typically after a planarization step) such that surface waveguide 704 is bonded to lateral overgrowth interface region 708. In some embodiments, lateral overgrowth interface region 708 is not included.

In some embodiments, a layer of silicon is formed on substrate 706 after formation of laser 702 via a suitable growth method, such as epitaxial deposition of silicon on compound semiconductor (e.g., GaAs), low-pressure chemical vapor deposition (LPCVD), plasma-enhanced chemical vapor deposition (PECVD), sputter deposition, and the like.

As a result, light generated at the active region of laser 702 is coupled upward into the silicon waveguide disposed above the laser.

Figure 8:
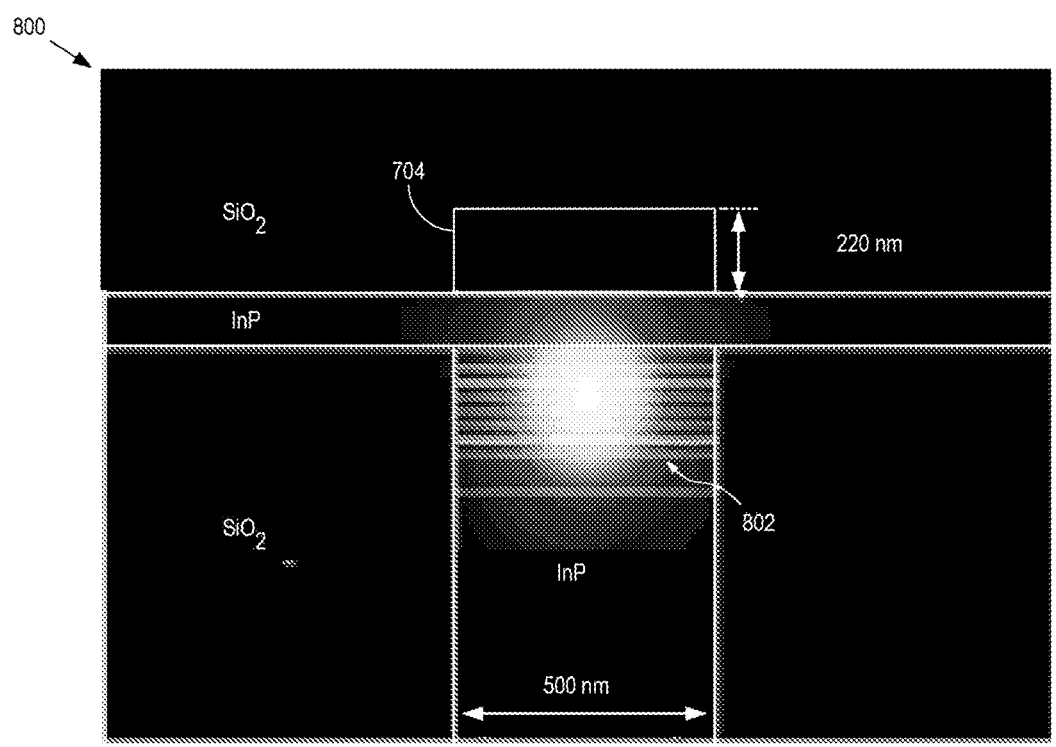
FIG. 8 depicts a simulation of the optical mode of a laser analogous to laser 702.

FIG. 8 depicts a simulation of the optical mode of a laser analogous to laser 702. It is clear from plot 800 that optical mode 802 is a hybrid mode that exists simultaneously in both laser 502 and surface waveguide 104.

Figure 9:
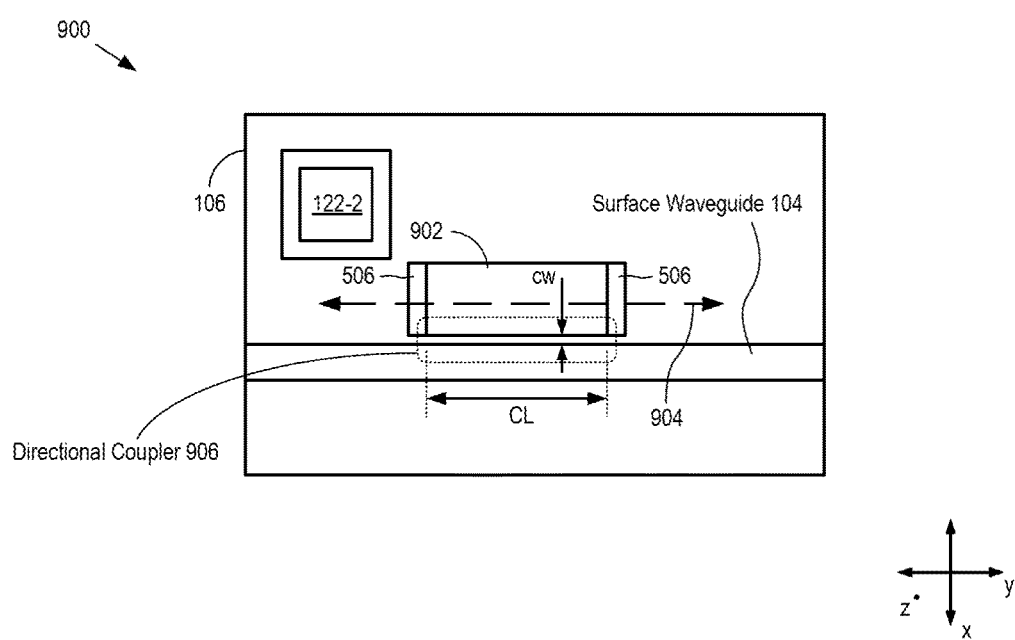
FIG. 9 depicts a schematic drawing of a top view of a silicon-based PIC in accordance with a third alternative embodiment of the present invention.

FIG. 9 depicts a schematic drawing of a top view of a silicon-based PIC in accordance with a third alternative embodiment of the present invention. PIC 900 includes laser 902 and surface waveguide 104, which are monolithically integrated on substrate 106.

Laser 902 is analogous to laser 502 described above; however, laser 902 is formed such that its active region is substantially coplanar with ridge 124 of waveguide 104. Laser 902 has a longitudinal optical mode that is oriented along axis 904.

Laser 902 and surface waveguide 104 are located in close proximity such that the active region of the laser and ridge 124 are separated by a very small lateral gap—coupling width cw. As a result, light emitted by the laser is evanescently coupled into the waveguide through this gap. As a result, laser 902 and waveguide 104 collectively define directional coupler 906 having coupling length CL. In some embodiments, waveguide 124 bends away from laser 902 outside of the region of the directional coupler to inhibit optical coupling between them except within the directional coupler itself.

As depicted, the slab region of waveguide 104 is removed within the region of the directional coupler to enhance coupling efficiency between the elements. In some embodiments, the slab region is retained and evanescent coupling of optical energy into ridge 124 occurs through the slab region.

Figure 10:
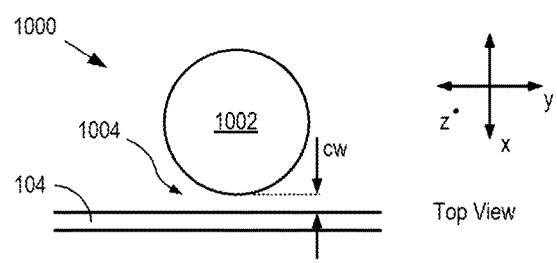
FIG. 10 depicts a schematic drawing of a top view of a silicon-based PIC in accordance with a fourth alternative embodiment of the present invention.

FIG. 10 depicts a schematic drawing of a top view of a silicon-based PIC in accordance with a fourth alternative embodiment of the present invention. PIC 1000 includes laser 1002 and surface waveguide 104.

Laser 1002 is analogous to laser 102 described above; however, laser 1002 is formed such that it is a circular mesa. As a result, light propagates in a whispering gallery mode along its perimeter. In some embodiments, laser 1002 has a shape other than a circular mesa, such as a ring, racetrack, or other suitable shape.

Laser 1002 is formed close to surface waveguide 104 such that the two are separated by coupling width cw at their nearest point (i.e., at coupler 1004). Light generated by laser 1002, therefore, couples into surface waveguide 104 at this point.

It should be noted that the coupling relationship depicted in FIG. 10A is merely one example of suitable laser/waveguide coupling arrangements in accordance with the present invention.

Figure 11:
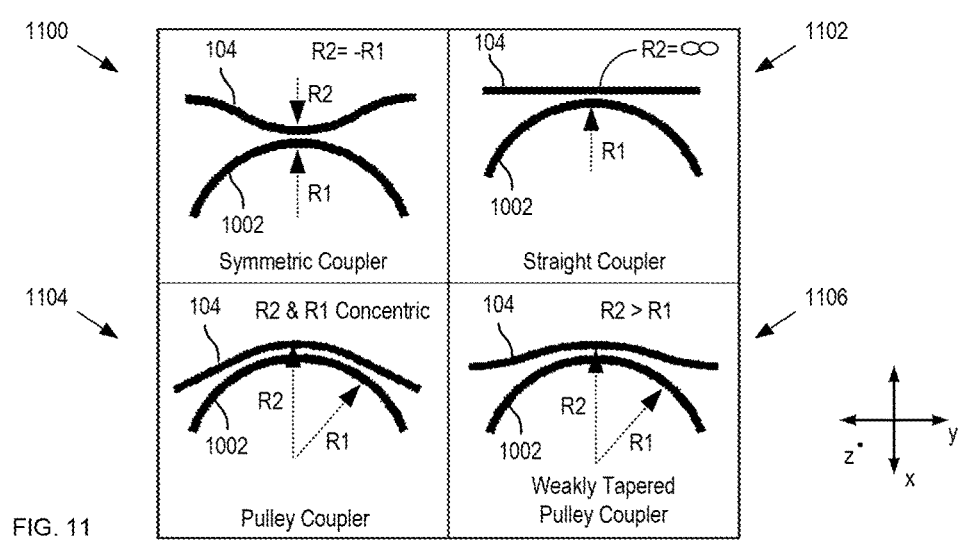
FIG. 11 depicts examples of configurations suitable for enabling lateral evanescent coupling between laser 1002 and surface waveguide 104.

FIG. 11 depicts examples of configurations suitable for enabling lateral evanescent coupling between laser 1002 and surface waveguide 104.

Coupler 1100 is a symmetric coupler wherein the radius of laser 1002 (i.e., R1) is equal to the radius of waveguide 104 (i.e., R2) in the coupling region between them; however, the radii are directed in opposite directions.

Coupler 1102 is a straight coupler, analogous to the coupler 1004 of PIC 1000. In coupler 1102, waveguide 104 is straight in the coupling region between it and laser 1002; therefore, the radius of waveguide 104 is infinity.

Coupler 1104 is a so-called "pulley coupler," wherein R2 is greater than R1 and R2 and R1 are concentric at the coupling region between waveguide 104 and laser 1002.

Coupler 1106 is a weakly tapered pulley coupler, wherein R2 is greater than R1 but still substantially concentric at the coupling region between waveguide 104 and laser 1002.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
   a substrate comprising a first semiconductor that has an indirect bandgap; and
   a first device that is an active optical device, the first device comprising an active region having:
   a first plurality of light-emitting regions that is dimensioned and arranged to provide at least two degrees of spatial and electrical charge-carrier confinement, wherein the first plurality of light-emitting regions comprises a first material that is a direct-bandgap compound semiconductor having a first bandgap ($Eg_1$); and
   an electronic confinement layer that substantially completely surrounds each of the first plurality of light-emitting regions, wherein the confinement layer comprises a second material having a second bandgap ($Eg_2$) that is greater than the first bandgap;
   wherein the first device and the substrate are monolithically integrated.

2. The apparatus of claim 1 wherein the first plurality of light-emitting regions is a single structure selected from the group consisting of a quantum dot, a quantum wire, and a quantum dash.

3. The apparatus of claim 1 wherein the second material is characterized by a defect-related trap level ($E_{defect}$) that is located at an energy level other than the center of the second bandgap, and wherein the defect-related trap level is operative for mitigating recombination-enhanced defect-reaction-driven degradation of the first device.

4. The apparatus of claim 1 wherein the second material is characterized by a defect-related trap level that is located at an energy level other than the center of the second bandgap, and wherein the defect-related trap level is located at an energy level in one of the conduction band ($E_c$) and the valence band ($E_v$) of the second material.

5. The apparatus of claim 1 wherein the first material comprises $(In_xGa_y)_{0.5}As_{0.5}$, and wherein x+y=1 and the second material comprises $(In_aAl_bGa_c)_{0.5}(As_uP_v)_{0.5}$, and wherein a+b+c=1, u+v=1, and a≥0.5.

6. The apparatus of claim 1 wherein the substrate is a silicon-on-insulator (SOI) substrate comprising a silicon device layer disposed on a buried oxide layer disposed on a silicon handle wafer and wherein the silicon device layer includes a surface waveguide, and further wherein the laser structure and the substrate are arranged such that the active region and the surface waveguide are optically coupled.

7. The apparatus of claim 6 wherein the first device is in direct physical contact with the silicon handle wafer, and wherein the active region and the surface waveguide are substantially coplanar in a plane that is parallel with a major surface of the silicon handle wafer.

8. The apparatus of claim 6 wherein the first device and the surface waveguide are arranged such that the active region and the surface waveguide are evanescently coupled.

9. The apparatus of claim 1 wherein the first device includes a first layer that is outside of the active region, the first layer comprising a third material is characterized by a third bandgap ($Eg_4$) and a defect-related trap level ($E_{defect}$) that is located at an energy level other than the center of the third bandgap.

10. The apparatus of claim 9 wherein the defect-related trap level is located at an energy level located in one of the conduction band ($E_c$) and the valence band ($E_v$) of the third material.

11. An apparatus comprising:
    a substrate comprising single-crystal silicon; and
    a laser structure comprising an active region having:
    a first plurality of light-emitting regions, each light-emitting region of the first plurality thereof comprising a first material that is a first compound semiconductor having a first bandgap ($Eg_1$); and
    a first confinement layer that substantially completely surrounds each of the first plurality of light-emitting regions, wherein the first confinement layer comprises a second material that is a second compound semiconductor having a second bandgap ($Eg_2$) that is greater than the first bandgap, and wherein the second material is characterized by a defect-related trap level ($E_{defect}$) that substantially suppresses recombination-enhanced defect-reaction-driven degradation of the laser structure;
    wherein at least one of the first plurality of light-emitting regions is a structure selected from the group consisting of quantum dots, quantum wires, and quantum dashes;
    wherein the first plurality of light-emitting regions and the first confinement layer collectively provide spatial and electrical charge-carrier confinement; and
    wherein the laser structure and the substrate are monolithically integrated and in direct contact.

12. The apparatus of claim 11 wherein the defect-related trap level is located at an energy level other than the center of the second bandgap.

13. The apparatus of claim 11 wherein the defect-related trap level is located within one of the conduction band ($E_c$) and the valence band ($E_v$) of the second material.

14. The apparatus of claim 11 further comprising a surface waveguide disposed on the substrate, wherein the active region and the surface waveguide are optically coupled, and wherein the active region and the surface waveguide are substantially coplanar in a plane that is substantially parallel with a major surface of the substrate and wherein the active region and the surface waveguide are evanescently coupled.

15. The apparatus of claim 11 wherein the active region further includes:
- a second plurality of light-emitting regions, each light-emitting region of the second plurality thereof comprising the first material; and
- a second confinement layer that surrounds each of the second plurality of light-emitting regions, wherein the second confinement layer comprises the second material;
- wherein at least one of the second plurality of light-emitting regions is a structure selected from the group consisting of quantum dots, quantum wires, and quantum dashes; and
- wherein the second plurality of light-emitting regions and the second confinement layer collectively provide at least one of spatial and electrical charge-carrier confinement.

16. A method for forming a photonic integrated circuit (PIC) comprising:
- forming an active optical device on a substrate that comprises an indirect-bandgap semiconductor, the active optical device comprising an active region having:
  - at least one light-emitting region that comprises a first material that is a direct-bandgap semiconductor having a first bandgap ($Eg_1$); and
  - a confinement layer that substantially completely surrounds the at least one light-emitting region, wherein the confinement layer comprises a second material having a second bandgap ($Eg_2$) that is greater than the first bandgap;
- wherein the at least one light-emitting region and the confinement layer are collectively operative for providing spatial and electrical charge-carrier confinement in at least two dimensions; and
- providing a surface waveguide that is disposed on the substrate; wherein the active region and the surface region are optically coupled; and wherein at least a portion of the active optical device is formed via epitaxial growth on the substrate.

17. The method of claim 16 further comprising:
- providing the substrate such that the indirect-bandgap semiconductor is single-crystal silicon; and
- forming the active optical device such that at least one of the first material and second material is a compound semiconductor.

18. The method of claim 16 wherein the active optical device is formed such that it includes a first layer that is outside the active region, the first layer comprising a third material having a third bandgap ($Eg_4$), and wherein the third material is characterized by a defect-related trap level ($E_{defect}$) that substantially suppresses recombination-enhanced defect-reaction-driven degradation of the laser structure.

19. The method of claim 18 wherein the defect-related trap level is located at an energy level other than the center of the third bandgap.

20. The method of claim 18 wherein the defect-related trap level is located at an energy level located in one of the conduction band ($E_c$) and the valence band ($E_v$) of the third material.

* * * * *